US011902437B2

(12) United States Patent
Zacharias

(10) Patent No.: US 11,902,437 B2
(45) Date of Patent: Feb. 13, 2024

(54) METHOD AND SYSTEM FOR IMPROVING COUPLING AND COHESION OF AT LEAST ONE EDUCATIONAL PROGRAM

(71) Applicant: PEZO TECH LLC, Chatham, NJ (US)

(72) Inventor: Suzette Zacharias, Chatham, NJ (US)

(73) Assignee: PEZO TECH LLC, Chatham, NJ (US)

( * ) Notice: Subject to any disclaimer, the term of this patent is extended or adjusted under 35 U.S.C. 154(b) by 0 days.

(21) Appl. No.: 18/176,239

(22) Filed: Feb. 28, 2023

(65) Prior Publication Data

US 2023/0208635 A1    Jun. 29, 2023

Related U.S. Application Data

(63) Continuation of application No. 17/390,670, filed on Jul. 30, 2021.

(51) Int. Cl.
| | | |
|---|---|---|
| *H04L 29/06* | (2006.01) | |
| *H04L 9/08* | (2006.01) | |
| *H04L 9/32* | (2006.01) | |
| *G06N 20/00* | (2019.01) | |
| *G06F 18/214* | (2023.01) | |

(52) U.S. Cl.
CPC .......... *H04L 9/0891* (2013.01); *G06F 18/214* (2023.01); *G06N 20/00* (2019.01); *H04L 9/3236* (2013.01); *H04L 9/3297* (2013.01)

(58) Field of Classification Search
None
See application file for complete search history.

(56) References Cited

U.S. PATENT DOCUMENTS

| | | |
|---|---|---|
| 9,043,807 B2 | 5/2015 | Glazer et al. |
| 9,600,251 B1 | 3/2017 | Srivastava |
| 9,736,222 B1 | 8/2017 | Dahan |
| 9,942,336 B2 * | 4/2018 | Bostick ................. H04L 67/535 |
| 10,015,167 B1 | 7/2018 | O'Kennedy et al. |
| 10,257,052 B1 * | 4/2019 | Lønborg ................. H04L 41/50 |
| 10,592,302 B1 | 3/2020 | Hinrichs et al. |
| 10,621,014 B1 | 4/2020 | Ramachandran |
| 10,657,246 B2 | 5/2020 | Biswas et al. |
| 10,719,373 B1 | 7/2020 | Koponen et al. |
| 10,915,378 B1 | 2/2021 | Mary et al. |
| 11,080,410 B1 | 8/2021 | Sandall et al. |
| 11,089,109 B1 | 8/2021 | Bertz et al. |
| 11,170,099 B1 | 11/2021 | Sandall et al. |
| 11,216,318 B2 | 1/2022 | Tuli et al. |
| 11,238,181 B2 | 2/2022 | Khan et al. |
| 11,314,563 B1 | 4/2022 | Singh et al. |
| 11,546,338 B1 | 1/2023 | Charnauski et al. |
| 2012/0246701 A1 | 9/2012 | Swamy et al. |
| 2013/0046807 A1 | 2/2013 | Sakata et al. |
| 2013/0212603 A1 | 8/2013 | Cooke |
| 2015/0237037 A1 | 8/2015 | Staker et al. |

(Continued)

*Primary Examiner* — Andrew J Steinle
(74) *Attorney, Agent, or Firm* — Lerner David LLP

(57) ABSTRACT

Methods and systems to improve coupling and cohesion of at least one educational program are provided. In some examples, the methods and systems include at least one educational program, where the at least one educational program comprises a first application programming interface (API) that is configured to be coupled to a second API of an internet enabled electronic device in a restricted state and partially decoupled in an unrestricted state.

17 Claims, 3 Drawing Sheets

(56) References Cited

U.S. PATENT DOCUMENTS

| | | |
|---|---|---|
| 2015/0347617 A1 | 12/2015 | Weinig et al. |
| 2016/0057107 A1 | 2/2016 | Call et al. |
| 2016/0350561 A1 | 12/2016 | Poiesz et al. |
| 2016/0360004 A1 | 12/2016 | Lue-Sang et al. |
| 2016/0373455 A1 | 12/2016 | Shokhrin et al. |
| 2018/0176319 A1 | 6/2018 | Herlitz |
| 2019/0020659 A1 | 1/2019 | Loni et al. |
| 2019/0236199 A1 | 8/2019 | Mahalingam et al. |
| 2019/0278637 A1 | 9/2019 | Sukhija et al. |
| 2020/0034215 A1 | 1/2020 | Petrillo et al. |
| 2020/0167752 A1 | 5/2020 | Nguyen et al. |
| 2020/0310866 A1 | 10/2020 | Varadaraj et al. |
| 2021/0294671 A1 | 9/2021 | Hirsekorn |
| 2021/0406102 A1 | 12/2021 | Seetharaman et al. |
| 2022/0253333 A1 | 8/2022 | Rizzi et al. |
| 2022/0300361 A1 | 9/2022 | Rose et al. |
| 2023/0010578 A1 | 1/2023 | Burgess et al. |
| 2023/0027164 A1 | 1/2023 | Xu |

\* cited by examiner

METHOD AND SYSTEM FOR IMPROVING COUPLING AND COHESION OF AT LEAST ONE EDUCATIONAL PROGRAM

CLAIM OF PRIORITY

This application is a continuation of U.S. patent application Ser. No. 17/930,670 filed on Sep. 8, 2022, entitled "METHOD AND SYSTEM FOR IMPROVING COUPLING AND COHESION OF AT LEAST ONE EDUCATIONAL PROGRAM", the contents of which are hereby incorporated by reference in their entirety.

FIELD

The field of the present disclosure relates to a method and system to improve coupling and cohesion of at least one educational program.

INCORPORATION BY REFERENCE

The disclosure of United States Patent Application Publication No. 2018/0315332 is incorporated by reference in its entirety for all purposes.

BACKGROUND OF TECHNICAL PROBLEM

Educational programs can be used to limit the amount of time that a user of an internet enabled electronic device (such as, but not limited to a smartphone) can spend on non-educational tasks.

However, educational programs may interact with an application programming interface (API) of the internet enabled electronic device. An issue that arises with such a configuration is that the educational program must run in the background even when the device is not in a restricted state. This can cause issues with the operation of the device (e.g., sluggishness or crashing).

Accordingly, improvements in the API configurations of educational programs running on internet enabled electronic devices are needed.

SUMMARY OF TECHNICAL SOLUTIONS

Embodiments of the present disclosure may include a method and system of improving coupling and cohesion of at least one educational program. An exemplary method may include obtaining a system including a remote source, a first internet enabled electronic device, where the first internet enabled device may be in an unrestricted state, and a second internet enabled electronic device.

Embodiments may also include downloading, to the first internet enabled electronic device, from the remote source, at least one educational program, where the at least one educational program may include a first application programming interface (API), where the first API may be associated with the at least one educational program. In some embodiments, the unrestricted state may include the first API of the educational program partially decoupled from a second API.

In some embodiments, while partially decoupled, the second API runs freely from the first API except for at least one coupled component. In some embodiments, the second API may be associated with an operating system of the first internet enabled electronic device. In some embodiments, the first API may be partially decoupled from the second API upon the first API sending at least one unlock instruction from the first API to the second API.

In some embodiments, the unlock instruction commands the second API to allow a first user of the first internet enabled electronic device to access restricted content for a predetermined amount of time. In certain examples, the restricted content may be content that may be ordinarily accessible by the first user of the first internet enabled electronic device.

Embodiments may also include manually preselecting a list of restricted content, where the manually preselecting may be performed remotely, via the first API, by a second user of the second internet enabled electronic device. Embodiments may also include remotely transforming, via the first API, the first internet enabled electronic device into a restricted state, such that the first user may be prevented from accessing the restricted content.

In some embodiments, the restricted state may include the first API of the educational program coupled to the second API. In some embodiments, while coupled, the second API runs cohesively with the first API. In some embodiments, the first API may be coupled to the second API upon the first API sending at least one lock instruction to the second API.

In some embodiments, the at least one lock instruction commands the second API to prevent access to the restricted content. Embodiments may also include obtaining a set of rules associated with the first user, where the set of rules may include a preset educational quota and an educational count for the first user, the educational count having no limit.

Embodiments may also include generating, via the first API, the at least one educational program that can be played by the first user to raise the educational count. Embodiments may also include applying the set of rules to determine whether the educational count may be lower than the preset educational quota. Embodiments may also include raising the educational count, upon completion of the at least one educational program.

Embodiments may also include repeating the applying and raising until the educational count may be greater than or equal to the preset educational quota. Embodiments may also include once the educational count may be greater than or equal to the preset educational quota, remotely reverting, via the at least one unlock instruction, the first internet enabled electronic device to the unrestricted state, such that the first user may be granted access to the restricted content, for the predetermined amount of time.

Covered embodiments are defined by the claims, not this summary. This summary is a high-level overview of various aspects and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

Figure 1A:
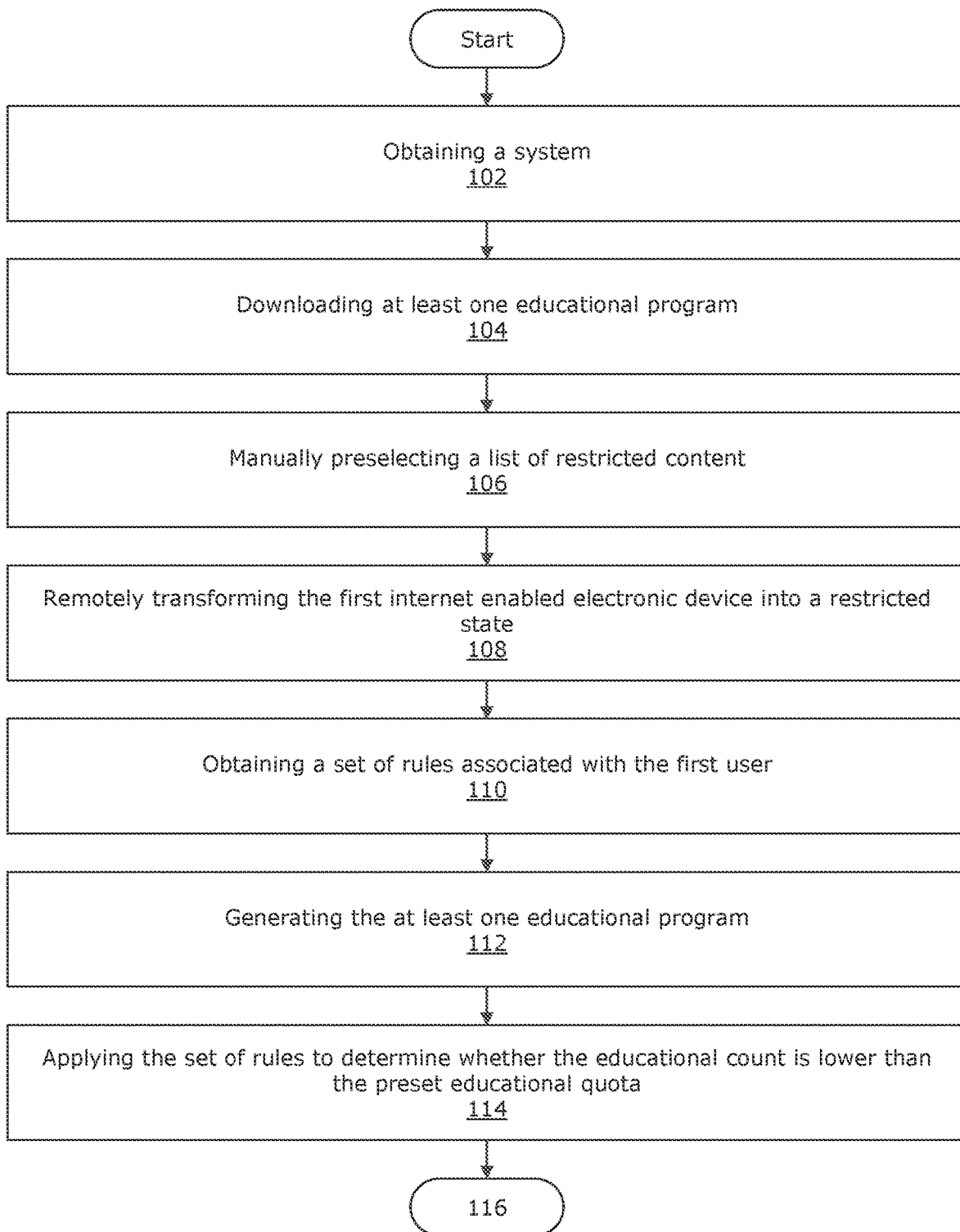
FIG. 1A is a flowchart illustrating a method, according to some embodiments of the present disclosure.

Some embodiments of the disclosure are herein described, by way of example only, with reference to the accompanying drawings. With specific reference now to the drawings in detail, it is stressed that the embodiments shown are by way of example and for purposes of illustrative discussion of embodiments of the disclosure. In this regard, the description taken with the drawings makes apparent to those skilled in the art how embodiments of the disclosure may be practiced.

DETAILED DESCRIPTION

Embodiments of the present disclosure may include a method and system of improving coupling and cohesion of at least one educational program.

As used in the present disclosure, "coupling" and other like terms (e.g., "coupled) refer to the degree of interdependence between operating system components (such as, but not limited to application programming interfaces (APIs)). An operating system component is "coupled" to another component when both components must work together to perform at least one specific task. An operating system component is "decoupled" to another component when components do not work together to perform at least one specific task.

An operating system component is "partially decoupled" when all but a subset of subcomponents to work together to perform a specific task. Unexpectedly, when operating systems according to some embodiments of the present disclosure are partially decoupled while in the unrestricted state, such that a subset of components of the first API are permitted to run in the background, the at least one educational program may run more smoothly and be less likely to crash. This may be because the memory load is more distributed over time. In some examples, there may be advantages to selecting a timer as the coupled component, as this may have the additional benefit of measuring the educational time, as discussed further below.

"Cohesion" or other like terms (e.g., "cohesive," "cohesively") refer to the degree to which components of an operating system (such as, but not limited to APIs) operate as a single unit. Operating system components operate "cohesively" when both components operate as a single component while performing the specific task.

An "educational program" is any program that restricts the usage of an internet enabled electronic device unless the user of the device has performed a predetermined set of educational tasks. In some examples, the program is a software program, a mobile application, a program on a computer readable medium, a cloud-based program, or any combination thereof. In some embodiments, the educational program may comprise educational videos, educational graphics, test-prep tools, study tools, math problems, games, reading prompts, any other educational component, or any combination thereof.

An exemplary method may include obtaining a system. In some examples the system may include a remote source, a first internet enabled electronic device, and a second internet enabled electronic device. The first internet enabled electronic device, the second internet enabled electronic device, or any combination thereof may comprise a computer, a smartphone, a tablet, a laptop, a desktop, any other internet-enabled device, or any combination thereof.

In certain examples the first internet enabled electronic device may initially be in an unrestricted state. As used herein, an "unrestricted state" is a state where a first API is partially decoupled from a second API. In some examples, the first API is associated with at least one educational program. In some embodiments, the second API may be associated with the operating system of the first internet enabled electronic device. In some examples, the second API is an Android™ API, an Apple™ Screentime API, or any combination thereof. In some examples, while partially decoupled, the second API runs freely from the first API except for at least one coupled component. In some embodiments, in the unrestricted state, the at least one coupled component of the second API comprises a timer, where the timer may be configured to measure the predetermined amount of time where the first user may be granted access to certain restricted content. In some embodiments, the first API may be partially decoupled from the second API upon the first API sending at least one unlock instruction from the first API to the second API. In some embodiments, the unlock instruction commands the second API to allow a first user of the first internet enabled electronic device to access restricted content for a predetermined amount of time.

As used herein, "restricted content" may be content that may be ordinarily accessible by the first user of the first internet enabled electronic device. Restricted content may include, but is not limited to, unauthorized applications, restricted videos, restricted images, restricted audio, restricted websites, or any combination thereof.

In some embodiments, the timer may be further configured to notify the first API when the predetermined amount of time (during which the first user has access to the restricted content) has elapsed. In some embodiments, upon notifying the first API that the predetermined amount of time has elapsed, the first API may be configured to initiate the remotely transforming step described in the present disclosure below. In some embodiments the timer is a part of the Android™ API, an Apple™ Screentime API, or any combination thereof.

Embodiments may also include downloading, to the first internet enabled electronic device, from the remote source, the at least one educational program, which comprises the first API.

Embodiments may also include manually preselecting a list of the restricted content, where the manually preselecting may be performed remotely, via the first API, by a second user of the second internet enabled electronic device. In some embodiments, the first user may be a minor and the second user may be a parent or guardian.

Embodiments may also include remotely transforming, via the first API, the first internet enabled electronic device into a restricted state. As used herein, a "restricted state" is a state where the first API of the educational program coupled to the second API, in such a way that prevents the first user from accessing the restricted content.

In some embodiments, while coupled, the second API runs cohesively with the first API. In certain examples, the cohesion results in an alternate educational operating system where non-educational components of the operating system are inaccessible.

In some embodiments, the first API may be coupled to the second API upon the first API sending at least one lock instruction to the second API. In some embodiments, the at least one lock instruction commands the second API to prevent access to the restricted content.

In some examples where the second API is a customized Android API In some such examples, the second API may comprise a custom service, where the custom service may be configured to lock all content other than at least one decoupled component. In some embodiments, the at least one decoupled component of the customized Android API in the restricted state. The at least one decoupled component, may, in some examples, comprise at least one educational program, a keypad of the first internet enabled electronic device, or any combination thereof. In some examples, the at least one decoupled component of the customized Android API in the restricted state comprises at least one preauthorized mobile application, at least one browser displaying preauthorized content, or any combination thereof.

Embodiments may also include obtaining a set of rules associated with the first user, where the set of rules may include a preset educational quota and an educational count for the first user, the educational count having no limit.

Embodiments may also include generating, via the first API, the at least one educational program that can be played by the first user to raise the educational count. Embodiments may also include applying the set of rules to determine whether the educational count may be lower than the preset educational quota. Embodiments may also include raising the educational count, upon completion of the at least one educational program.

Embodiments may also include repeating the applying and raising until the educational count may be greater than or equal to the preset educational quota.

In some embodiments, once the educational count may be greater than or equal to the preset educational quota, remotely reverting, via the at least one unlock instruction, the first internet enabled electronic device to the unrestricted state, such that the first user may be granted access to the restricted content, for the predetermined amount of time.

In some embodiments, the method may include displaying a custom graphic when the user attempts to access restricted content when the educational count may be not greater than or equal to the preset educational quota. In some embodiments, the custom graphic indicates that the restricted content may be locked.

Figure 1B:
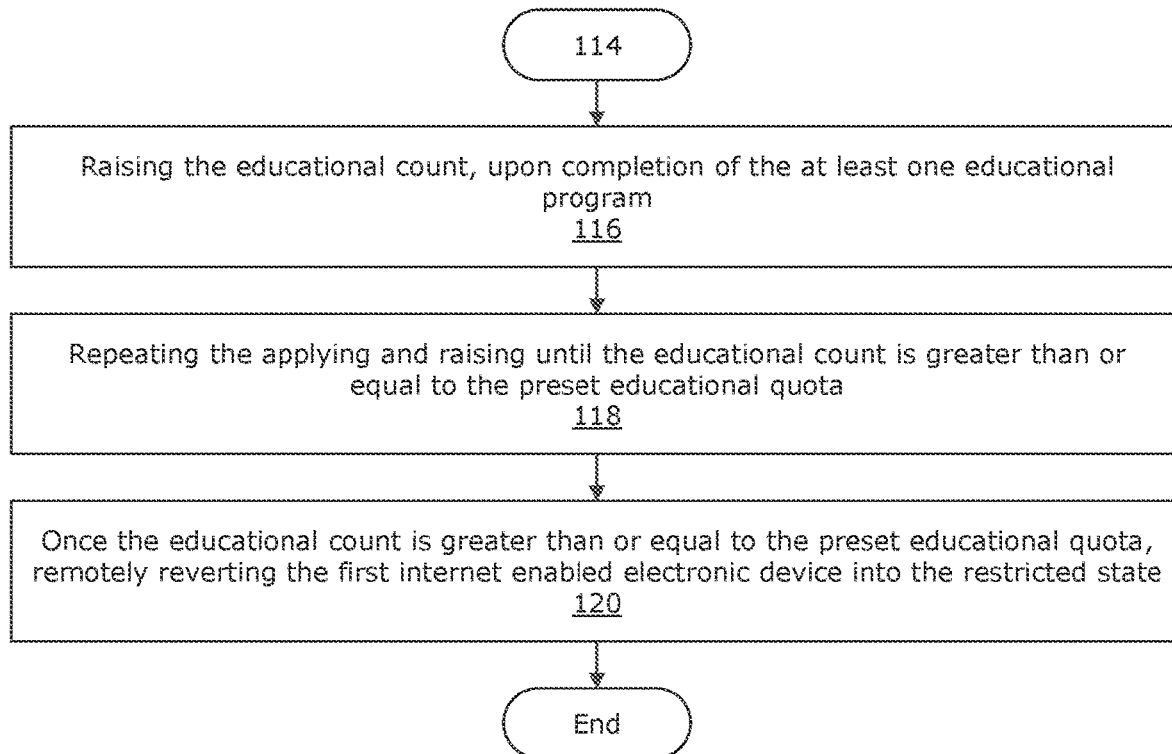
FIG. 1B is a flowchart extending from FIG. 1A and further illustrating the method, according to some embodiments of the present disclosure.

FIGS. 1A to 1B are flowcharts that describe a method, according to some embodiments of the present disclosure. In some embodiments, at 102, the method may include obtaining a system described by the present disclosure.

In some embodiments, at 104, the method may include downloading, to the first internet enabled electronic device, from the remote source, at least one educational program, where the at least one educational program comprises a first application programming interface (API), where the first API may be associated with the at least one educational program. In some embodiments, at 106, the method may include manually preselecting a list of restricted content, where the manually preselecting may be performed remotely, via the first API, by a second user of the second internet enabled electronic device. At 108, the method may include remotely transforming, via the first API, the first internet enabled electronic device into a restricted state, such that the first user may be prevented from accessing the restricted content.

In some embodiments, at 110, the method may include obtaining a set of rules associated with the first user, where the set of rules comprises a preset educational quota and an educational count for the first user, the educational count having no limit. At 112, the method may include generating, via the first API, the at least one educational program that can be played by the first user to raise the educational count. At 114, the method may include applying the set of rules to determine whether the educational count may be lower than the preset educational quota.

In some embodiments, at 116, the method may include raising the educational count, upon completion of the at least one educational program. At 118, the method may include repeating the applying and raising until the educational count may be greater than or equal to the preset educational quota. At 120, the method may include, once the educational count may be greater than or equal to the preset educational quota, remotely reverting, via the at least one unlock instruction, the first internet enabled electronic device to the unrestricted state, such that the first user may be granted access to the restricted content, for the predetermined amount of time.

Figure 2:
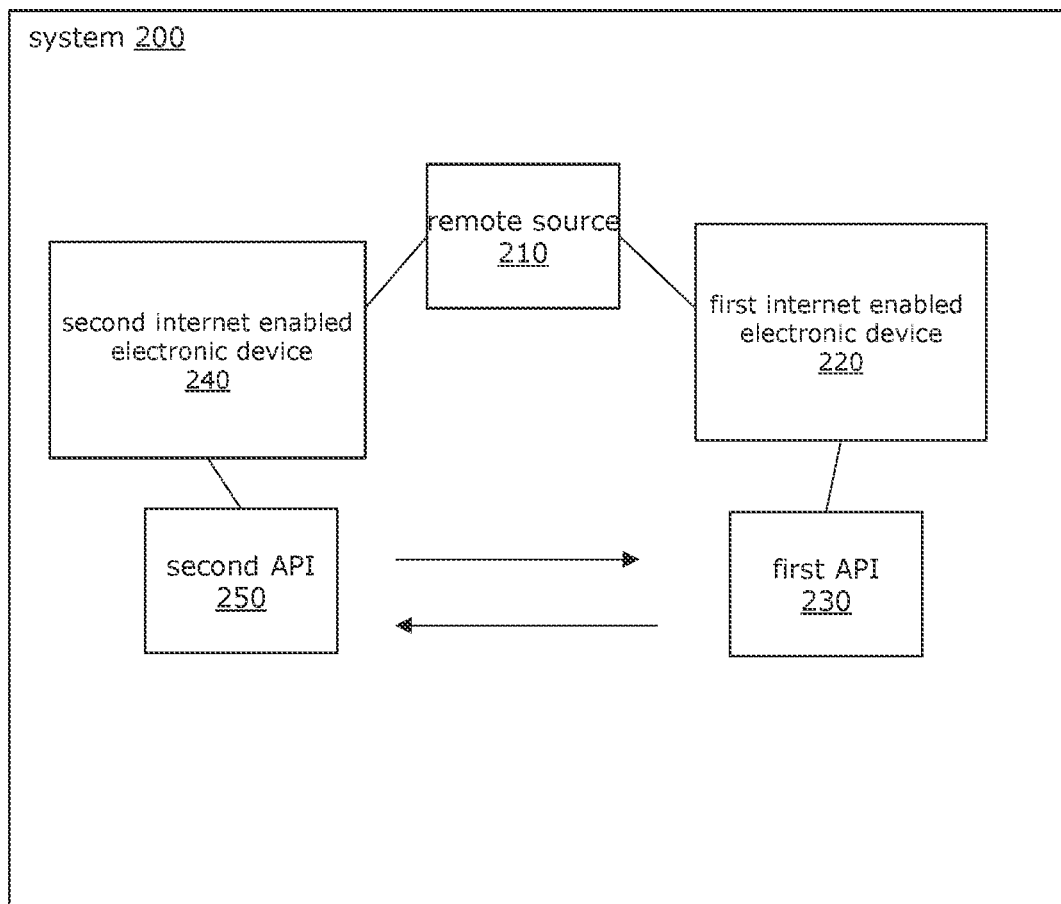
FIG. 2 is a block diagram illustrating a system according to some embodiments of the present disclosure.

FIG. 2 is a block diagram that describes a system 200, according to some embodiments of the present disclosure. The system 200 may include a first internet enabled electronic device 220, where the first internet enabled device 220 may be in an unrestricted state. The system 200 may also include a first application programming interface 230 (API), where the first API may be associated with the at least one educational program. In some embodiments, the system 200 may include a remote source 210, a second internet enabled electronic device 240, and a second API 250.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein. Among those benefits and improvements that have been disclosed, other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given regarding the various embodiments of the disclosure which are intended to be illustrative, and not restrictive.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. All embodiments of the disclosure are intended to be combinable without departing from the scope or spirit of the disclosure.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

All prior patents, publications, and test methods referenced herein are incorporated by reference in their entireties.

Variations, modifications and alterations to embodiments of the present disclosure described above will make themselves apparent to those skilled in the art. All such variations, modifications, alterations and the like are intended to fall within the spirit and scope of the present disclosure, limited solely by the appended claims.

Any feature or element that is positively identified in this description may also be specifically excluded as a feature or element of an embodiment of the present as defined in the claims.

As used herein, the term "consisting essentially of" limits the scope of a specific claim to the specified materials or steps and those that do not materially affect the basic and novel characteristic or characteristics of the specific claim.

The disclosure described herein may be practiced in the absence of any element or elements, limitation or limitations, which is not specifically disclosed herein. Thus, for example, in each instance herein, any of the terms "comprising," "consisting essentially of" and "consisting of" may be replaced with either of the other two terms. The terms and expressions which have been employed are used as terms of description and not of limitation, and there is no intention in the use of such terms and expressions of excluding any equivalents of the features shown and described or portions thereof, but it is recognized that various modifications are possible within the scope of the disclosure.

The invention claimed is:

1. A method comprising:
    obtaining a system comprising:
        a remote source;
        a first internet enabled electronic device, where the first internet enabled device is in an unrestricted state; and
        a second internet enabled electronic device;
    downloading, to the first internet enabled electronic device, from the remote source, at least one educational program, where the at least one educational program comprises a first application programming interface (API), where the first API is associated with the at least one educational program;
        where the unrestricted state comprises the first API of the educational program partially decoupled from a second API,
        where, while partially decoupled, the second API runs freely from the first API except for at least one coupled component;
        where the second API is associated with an operating system of the first internet enabled electronic device,
        where the first API is partially decoupled from the second API upon the first API sending at least one unlock instruction from the first API to the second API,
        where the unlock instruction commands the second API to allow a user of the first internet enabled electronic device to access restricted content for a predetermined amount of time,
        where the restricted content is content that is ordinarily accessible by the user of the first internet enabled electronic device;
    manually preselecting a list of restricted content, where the manually preselecting is performed remotely, via the first API, by a user of the second internet enabled electronic device;
    remotely transforming, via the first API, the first internet enabled electronic device into a restricted state, such that the user is prevented from accessing the restricted content;
        where the restricted state comprises the first API of the educational program coupled to the second API;
        where, while coupled, the second API runs cohesively with the first API;
        where the first API is coupled to the second API upon the first API sending at least one lock instruction to the second API,
        where the at least one lock instruction commands the second API to prevent access to the restricted content;
    obtaining a set of rules associated with the user, where the set of rules comprises a preset educational quota and an educational count for the user, the educational count having no limit;
    generating, via the first API, the at least one educational program that can be played by the user to raise the educational count;
    applying the set of rules to determine whether the educational count is lower than the preset educational quota;
    raising the educational count, upon completion of the at least one educational program;
    repeating the applying and raising until the educational count is greater than or equal to the preset educational quota; and
    once the educational count is greater than or equal to the preset educational quota, remotely reverting, via the at least one unlock instruction, the first internet enabled electronic device to the unrestricted state, such that the user is granted access to the restricted content, for the predetermined amount of time.

2. The method of claim 1, where the at least one coupled component of the second API in the unrestricted state comprises a timer, where the timer is configured to measure the predetermined amount of time where the user is granted access to the restricted content.

3. The method of claim 2, where the timer is further configured to notify the first API when the predetermined amount of time has elapsed.

4. The method of claim 2, where the timer that is configured to notify the first API when the predetermined amount of time is met is associated with the Apple Screentime API.

5. The method of claim 3, where upon notifying the first API that the predetermined amount of time has elapsed, the first API is configured to initiate the remotely transforming step.

6. The method of claim 1, where the remote source comprises at least one server computer, where the first internet enabled electronic device and the second internet enabled electronic device are client devices of the at least one server computer.

7. The method of claim 1, where the first internet enabled electronic device, the second internet enabled electronic device, or any combination thereof comprises a smartphone, a tablet, a gaming device, a desktop computer, a laptop computer, or any combination thereof.

8. The method of claim 1, where the second API is the Apple Screentime API.

9. The method of claim 1, where the second API is a customized Android API, where the customized Android API comprises a custom service, where the custom service is configured to lock all content other than at least one decoupled component.

10. The method of claim 9, where the at least one decoupled component of the customized Android API in the restricted state comprises the at least one educational program, a keypad of the first internet enabled electronic device, or any combination thereof.

11. The method of claim 9, where the at least one decoupled component of the customized Android API in the restricted state comprises at least one preauthorized mobile application, at least one browser displaying preauthorized content, or any combination thereof.

12. The method of claim 9, where the timer that is configured to notify the first API when the predetermined amount of time is met is associated with the customized Android API.

13. The method of claim 1, where the list of restricted content comprises a list of unauthorized mobile applications.

14. The method of claim 1, further comprising displaying a custom graphic when the user attempts to access restricted content when the educational count is not greater than or equal to the preset educational quota.

15. The method of claim 14, where the custom graphic indicates that the restricted content is locked.

16. A system comprising:
a remote source;
a first internet enabled electronic device, where the first internet enabled device is in an unrestricted state; and
a second internet enabled electronic device;
where the first internet enabled electronic device is configured to download, from the remote source, at least one educational program, where the at least one educational program comprises a first application programming interface (API), where the first API is associated with the at least one educational program;
where the unrestricted state comprises the first API of the educational program partially decoupled from a second API,
where, while partially decoupled, the second API runs freely from the first API except for at least one coupled component;
where the second API is associated with an operating system of the first internet enabled electronic device,
where the first API is partially decoupled from the second API upon the first API sending at least one unlock instruction from the first API to the second API,
where the at least one unlock instruction commands the second API to allow a user of the first internet enabled electronic device to access restricted content for a predetermined amount of time,
where the restricted content is content that is ordinarily accessible by the user of the first internet enabled electronic device;
where the second internet enabled electronic device is configured to allow the user to manually preselect a list of restricted content remotely, via the first API;
where the second internet enabled electronic device is further configured to allow the user to, via the first API, transform the first internet enabled electronic device into a restricted state, such that the user is prevented from accessing the restricted content;
where the restricted state comprises the first API of the educational program coupled to the second API;
where, while coupled, the second API runs cohesively with the first API;
where the first API is coupled to the second API upon the first API sending at least one lock instruction to the second API,
where the at least one lock instruction commands the second API to prevent access to the restricted content;
where the first internet enabled electronic device is further configured to obtain a set of rules associated with the user, where the set of rules comprises a preset educational quota and an educational count for the user, the educational count having no limit;
where the first internet enabled electronic device is further configured to generate, via the first API, the at least one educational program that can be played by the user to raise the educational count;
where the first internet enabled electronic device is further configured to apply the set of rules to determine whether the educational count is lower than the preset educational quota;
where the first internet enabled electronic device is further configured to raise the educational count, upon completion of the at least one educational program;
where the first internet enabled electronic device is further configured to apply the set of rules and raise the educational count until the educational count is greater than or equal to the preset educational quota; and
where, once the educational count is greater than or equal to the preset educational quota, the second internet enabled electronic device is configured to remotely revert, via the at least one unlock instruction, the first internet enabled electronic device to the unrestricted state, such that the user is granted access to the restricted content, for the predetermined amount of time.

17. The system of claim 16, where the at least one coupled component of the second API in the unrestricted state comprises a timer, where the timer is configured to measure the predetermined amount of time where the first user is granted access to the restricted content.

* * * * *